Figure 1:
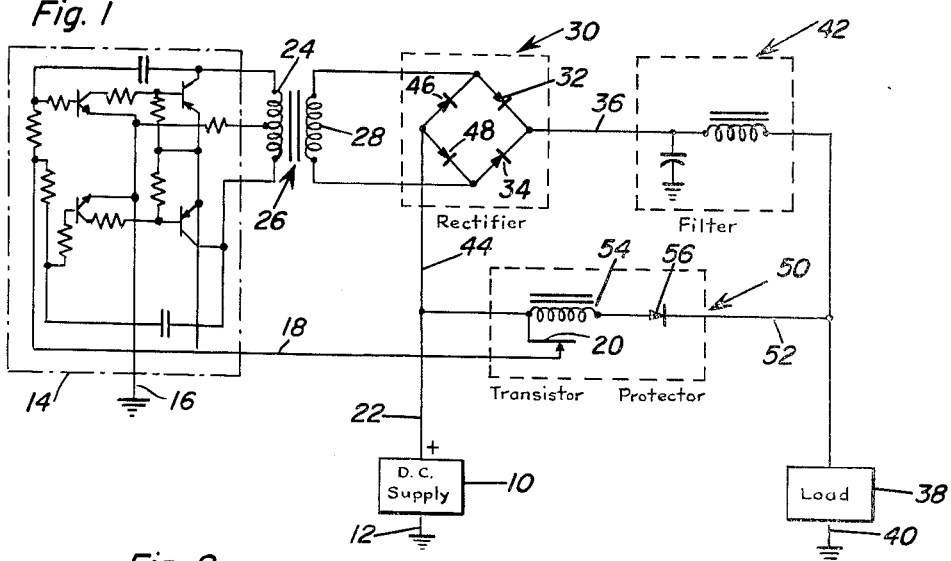

Aug. 17, 1965   A. FERRI   3,201,649
TRANSISTOR PROTECTION CIRCUIT
Filed April 20, 1960

Aurelio Ferri
INVENTOR.

United States Patent Office 3,201,649
Patented Aug. 17, 1965

3,201,649
TRANSISTOR PROTECTION CIRCUIT
Aurelio Ferri, Norwich, Conn., assignor to Alpha Instrument, Inc., New London, Conn., a corporation of Connecticut
Filed Apr. 20, 1960, Ser. No. 23,465
7 Claims. (Cl. 317—18)

This invention relates generally to electrical circuit protection means and more particularly to means for protecting transistors utilized in D.C. to D.C. power supplies in the event a load is subjected to a short circuit.

Transistor switching circuits are utilized in D.C. to D.C. power supplies for converting the energy from a direct current source to alternating current which may be transformed to a higher voltage output which is in turn rectified to a high D.C. voltage. Circuits of this type often make use of the original direct current potential for the purpose of impressing it on the rectifying circuit so as to attain a still higher D.C. output potential. The direct current output of the rectifier circuit will be connected, perhaps through a filter network, to a direct current load. It will be apparent that if the load is for any reason short-circuited, considerable damage can be done to the transistor switching circuit. It is therefore imperative to provide means for preventing the switching from being damaged when the load is short-circuited. It of course would be preferable to provide some type of arrangement which controlled the input section to the switching circuit when the load is shorted. Of course, it is necessary to provide such protective means which would not effect the normal circuit operation of the power supply. Also, it is of course desirable to provide protective means which would be simple and inexpensive and therefore of a practical nature.

In accordance with the above, it is the principal object of this invention to provide novel circuit protection means for protecting transistor switching circuits utilized in D.C. to D.C. power supplies in the event of a short circuited load.

It is a more particular object of this invention to provide means for controlling the input section to a transistor switching circuit used in a D.C. to D.C. power supply when a circuit load is subjected to a short circuiting condition.

It is a still more particular object of this invention to provide circuit protection means for the transistor switching circuit whose circuitry and operation is of a simple nature and accordingly inexpensive and reliable. Moreover, the protective means represent only a slight addition to the normal D.C. to D.C. power supply circuit and in no manner hinder the normal operation thereof.

It is a still further object of this invention to provide novel circuit protection means for protecting a transistor switching circuit used in a D.C. to D.C. power supply which operates effectively for controlling the switching circuit when any one of, several, or all of the loads become short-circuited.

Figure 2:
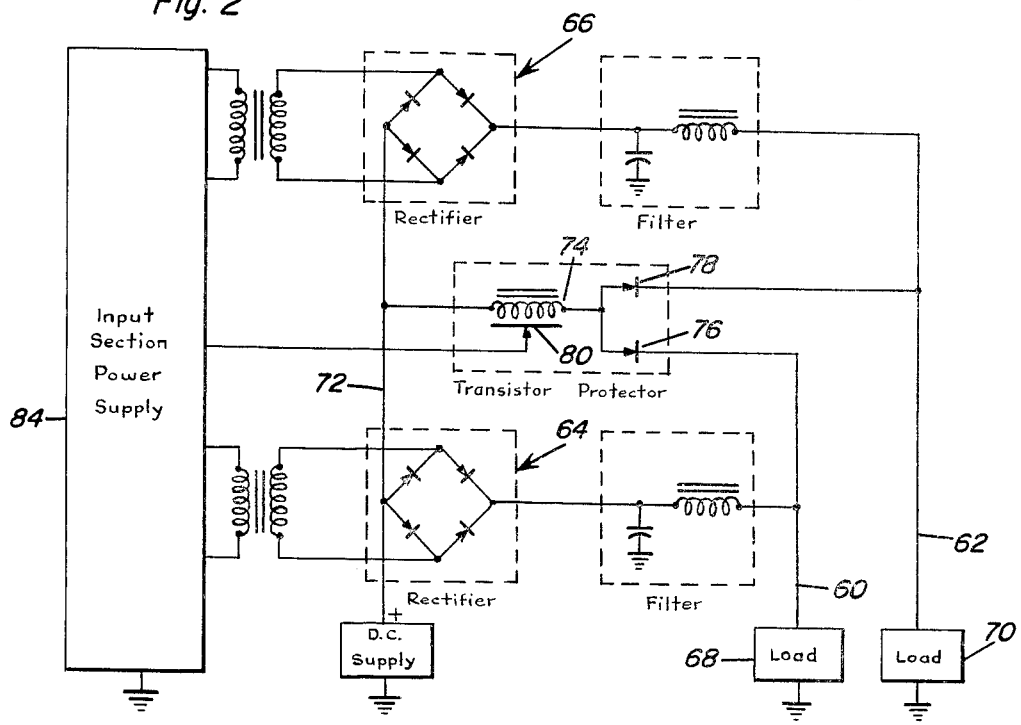

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic diagram illustrating a simplified circuit of a single output D.C. to D.C. power supply illustrating the transistor protector circuit; and FIGURE 2 is a schematic diagram illustrating a simplified circuit of a two output D.C. to D.C. power supply showing the transistor circuit protector and a suggesting means for utilizing the invention with any of a plurality of outputs.

Attention is initially called to FIGURE 1 wherein a direct current source 10 is illustrated as being electrically grounded at 12. A conventional transistor switching circuit 14 is grounded at 16 and is provided with an input conductor 18. The switching circuit 14 is well known in the art and may actually comprise any of several variations such as disclosed for example in Patent No. 2,798,-160. The particulars of the switching circuit form no part of the present invention. The switching circuit is, however, related to the protective system by having its input connected through conductor 18 and through normally closed relay switch 20 to the positive terminal 22 of the low voltage direct current source 10 for energization thereof. The switching circuit output is also impressed across primary winding 24 of transformer 26. The transformer 26 is a step-up transformer and accordingly a high voltage is impressed across secondary 28 thereof.

Connected to the secondary 28 is a rectifier circuit 30. The rectifier circuit 30 includes rectifiers 32 and 34 which are connected so as to allow current to flow from the secondary coil 28 to load line 36 electrically connected between the rectifiers 32 and 34. It will be appreciated that as the upper end of the coil 28 becomes positive, rectified current will flow through rectifier 32 while as the lower end of the coil 28 becomes positive, rectified current will flow through the rectifier 34 so as to supply a full wave rectified current to a load line 36. A load 38 is connected to the load line 36 through filter network 42 and thence to ground as at 40. The filter network is of conventional design and is interposed in the load line 36.

In order to boost the voltage to the load 38, conductor 44 connects the positive terminal of the direct current source 10 to the rectifier circuit 30. The conductor 44 is electrically connected between rectifier 46 and rectifier 48 which are arranged to allow the positive voltage on the conductor 44 to be impressed on the load line 36, through either the rectifiers 46 and 32, or the rectifiers 48 and 34. More particularly, it will be appreciated that the D.C. potential of conductor 44 is added to the full wave rectified output on the load line 36. This type of circuit arrangement is known as a "bootstrap" circuit.

The means for protecting the transistor switch circuit 14 includes a protective circuit branch 50 having a conductor 52 connected between the conductor 44 and load line 36. Interposed in the conductor 52 is a relay coil 54 serially connected to a rectifier 56. The relay switch 20 is responsive to the energization of the coil 54. From the schematic diagram, it will be appreciated that the rectifier 56 permits current flow through the conductor 50 in a direction from the conductor 44 to the load line 36 only. Current flow is prevented from the load line 36 to the conductor 44. Under normal operation of the circuit, direct current is supplied through relay switch 20 from positive terminal 22 of the D.C. source 10, to the input of switching circuit 14. A high voltage D.C. output that has been rectified and filtered is accordingly continually impressed on load line 36, which of course of necessity is at a greater potential than the conductor 44. Therefore, the potential difference is such under normal conditions to urge current flow through conductor 52 from load line 36 to conductor 44. Of course, this flow is prevented by the rectifier 56. It will therefore be appreciated that the circuit may normally function with the relay coil 54 and relay switch 20 having no effect on the normal operation. However, when the voltage drop or impedance across the load 38 is abnormally reduced short-circuiting as by the load line 36 effectively becomes grounded. When this occurs, the conductor 44 of course is at a greater potential than the load line 36 and therefore a current will tend to flow through the conductor 52 in the direction permitted by the rectifier 56 in response to the reversal in potential difference. Of course, the coil 54 will become energized and open the normally closed relay switch 20 to open the input circuit to the transistor switching circuit 14. Therefore, the switching circuit 14 will immediately cease operation and no damage will be done thereto.

Attention is now called to FIGURE 2 wherein a circuit is illustrated showing how the teachings of the invention may be employed with more than one output. It should be appreciated that, although, not illustrated, the teachings of the invention are applicable to a circuit having any number of outputs. In the circuit of FIGURE 2, load lines 60 and 62 extend from rectifiers 64 and 66 to loads 68 and 70. Conductor 72 extends from the positive side of the D.C. source and is connected to each of the rectifier circuits 64 and 66 in the same manner as illustrated in FIGURE 1. A relay coil 74 is connected from the conductor 72 in series with rectifiers 76 and 78 which in turn are connected to load line 60 and 62. Relay switch 80 connects the positive terminal of the D.C. source to a transistor switching circuit 84. Again, it will be appreciated that the load lines 60 and 62 normally are at a greater voltage than the conductor 72 and therefore under normal operation of the circuit, no current will flow through relay coil 74. However, when a short circuit occurs in either of the load 68 and 70, the load line 60 or 62 is effectively grounded so as to permit current flow from conductor 72 to ground. The relay coil 74 will therefore become energized and open the relay switch 80 to open the input to the switching circuit 84. It of course will be appreciated that the teachings of FIGURE 2 may be extended to a circuit having any number of load lines.

In the bootstrap type circuits shown in the drawings, the use of a current limiting device is necessary to protect the rectifier circuit 30 from becoming overloaded. The filter network and principally the inductor resistance serve as the current limiter. The current limiting effect of the filter network is necessary to the transistor protector because the relay coils 54 and 74 would be effectively paralleled by a short circuit and accordingly would not function in the event of a shorted load.

The illustrations show the transistor protector utilized only with D.C. to D.C. power supplies of the "bootstrap" type. It should be appreciated however, that the protector is applicable to "non-bootstrap" type circuits which differ from those shown by not employing means directly connecting the source to the rectifier circuit 30 or 64. Further, the means for controlling the input section to the switching circuit by the relay may be any of several. For example only, the input lead to the switching circuit as 18 could be opened or the emitter of the input section transistor may be connected to the base thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a transistorized voltage converting device having a low, D.C. voltage source, a high A.C. voltage output, a rectifier connecting said output to a load, a protective system for the voltage converting device comprising, means conductively coupling said low D.C. voltage source to said load for developing a unidirectional energizing current in response to an abnormally low impedance of the load, and means responsive to said energizing current in the conductive coupling means for open-circuiting said low voltage source with respect to the voltage converting device, said conductive coupling means including rectifying means connecting the open-circuiting means to the load preventing flow of current from the high voltage output to the open-circuiting means.

2. The combination of claim 1, including means connecting the low voltage source to the rectifier for boosting the high voltage output and current limiting filter means operatively connected between the high voltage output and the load for rendering current from the high voltage output ineffective to prevent development of said unidirectional energizing current.

3. The combination of claim 2, wherein said open-circuiting means comprises relay-operated switch means normally connecting said low voltage source to the voltage converting device for activation thereof.

4. The combination of claim 1 wherein said open-circuiting means comprises relay-operated switch means normally connecting said low voltage source to the voltage converting device for activation thereof.

5. In an electrical system having a low voltage source establishing a direct current potential relative to ground, a high voltage alternating current supply, a switching circuit adapted to be electrically connected to said low voltage source to produce an alternating current output from said high voltage supply, at least one rectifier circuit connected to said high voltage supply, at least one load normally establishing a substantial impedance relative to ground, and at least one high potential line connecting said rectifier circuit to the load independently of the low voltage source for supplying high voltage to the load, the improvement comprising, a protective circuit connected between said low voltage source and said high potential line, and means disposed in said protective circuit responsive to substantial grounding of said high potential line for disconnecting the switching circuit from the high voltage supply to protect the high voltage supply from short circuiting of the load.

6. The combination of claim 5, wherein said last-mentioned means includes a rectifier and current responsive switch means in series therewith for electrically connecting the low voltage source to the switching circuit to unidirectionally conduct current to the high potential line when grounded by reduction in the impedance of the load below a minimum value and block current when above said minimum value.

7. In combination with a transistor switching circuit for converting a low voltage input into a high voltage output, a rectifier circuit connected to said switching circuit for rectifying the high voltage output thereof, a load having a normally high impedance relative to ground, a load line operatively connected between said rectifier circuit and the load for conducting load current, a low voltage source operatively connected to the switching circuit for supplying said low voltage source to the rectifier circuit for impressing a direct current voltage on said rectified high voltage output, unidirectional current blocking means connecting said low voltage source to the load line preventing flow of said load current to the low voltage source, and relay means responsive to flow of energizing current through the current blocking means when an abnormally low impedance develops through the load for disconnecting the low voltage source from the switching circuit.

References Cited by the Examiner

UNITED STATES PATENTS

| 2,343,423 | 3/44 | Reagan | 317—52 X |
| 2,798,160 | 7/57 | Bruck | 321—2 |
| 2,815,446 | 12/57 | Coombs | 317—16 |
| 2,910,626 | 10/59 | Koros | 317—16 |
| 3,001,100 | 9/61 | Schuh | 317—33 X |

SAMUEL BERNSTEIN, *Primary Examiner.*